(No Model.)

J. DOLAN.
HEEL CALK.

No. 492,194. Patented Feb. 21, 1893.

WITNESSES:
H. A. Carhart
Geo. M. Blowers

INVENTOR.
James Dolan
BY
Smith & Denison
ATTORNEYS

UNITED STATES PATENT OFFICE.

JAMES DOLAN, OF GENESEO, NEW YORK.

HEEL-CALK.

SPECIFICATION forming part of Letters Patent No. 492,194, dated February 21, 1893.

Application filed June 13, 1892. Serial No. 436,453. (No model.)

*To all whom it may concern:*

Be it known that I, JAMES DOLAN, of Geneseo, in the county of Livingston, in the State of New York, have invented new and useful Improvements in Heel-Calks, of which the following, taken in connection with the accompanying drawings, is a full, clear, and exact description.

My invention relates to elastic heel calks as a new article of manufacture.

My object is to produce, as a new article of manufacture, an elastic heel calk applicable to be welded to any horseshoe; cheap, and durable in its construction and very efficacious in its operation.

Figure 1:
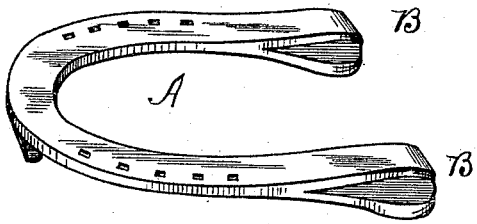
Figure 2:
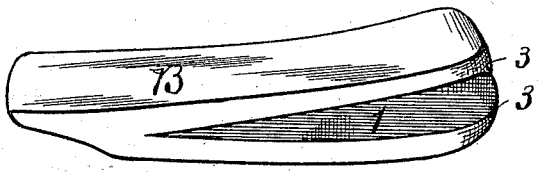
Figure 3:
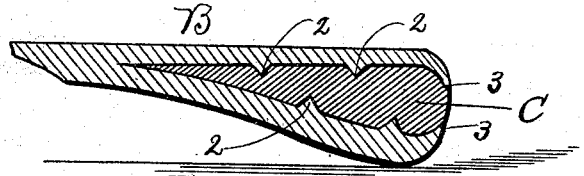
Figure 4:
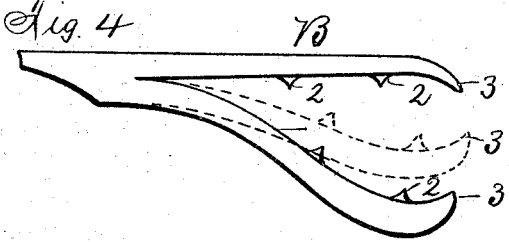
Figure 5:

My invention consists in the several novel features of construction and operation hereinafter described and which are specifically set forth in the claim hereto annexed. It is constructed as follows, reference being had to the accompanying drawings, in which Figure 1 is an isometrical elevation of a horseshoe provided with my elastic heel-calk. Fig. 2 is a view of a heel-calk as a new article of manufacture, detached. Fig. 3 is a longitudinal and vertical section thereof. Fig. 4 is a view thereof, showing the parts spread apart and the elastic material removed. Fig. 5 is a view of the elastic material, removed.

I have found by observation and practice that by constructing a shoe of solid, hard material, horses are liable to become sore and lame by constantly traveling upon stone pavements, and to that end I have constructed a heel-calk which may be readily welded to any shoe, thereby causing and imparting a certain amount of elasticity to the tread of the horse.

A—, is a shoe, provided with the heel-calks —B—, which are formed by laterally slotting the outer end at —1—, and providing the inner faces of said slotway with barbs, corrugations or roughened surfaces —2—, which prevent the elastic material —C— placed therein from moving in either direction. The outer ends of the calks are allowed to project inwardly like teeth, as shown at —3—, and serve to protect the end of the elastic material. The elastic material is preferably of rubber but it may be of any other suitable material.

When it is desired to weld the calk to the shoe, the slotway is pried open and the elastic material removed, and after the welding has been completed and the shoe allowed to cool, the elastic material is again inserted and the jaws, formed by the upper and lower sides of the calk, forced together upon the elastic material, where it is firmly held.

Having described my invention, what I claim, and desire to secure by Letters Patent, is—

A heel-calk as a new article of manufacture, having its rear end slotted laterally, barbs upon the inner faces thereof, and elastic material interposed in said slotway.

In witness whereof I have hereunto set my hand this 23d day of May, 1892.

JAMES DOLAN.

In presence of—
JOHN H. COYNE,
JOHN C. TOOLE.